United States Patent
Payne et al.

(10) Patent No.: US 9,079,679 B2
(45) Date of Patent: Jul. 14, 2015

(54) TRAY SEALING APPARATUS AND METHOD

(75) Inventors: David William Payne, Lutterworth (GB); Ulrich Carlin Nielsen, Ry (DK)

(73) Assignee: Ishida Europe Limited, West Midlands (GB)

( * ) Notice: Subject to any disclaimer, the term of this patent is extended or adjusted under 35 U.S.C. 154(b) by 218 days.

(21) Appl. No.: 13/703,323

(22) PCT Filed: Jun. 10, 2011

(86) PCT No.: PCT/GB2011/051082
§ 371 (c)(1),
(2), (4) Date: Feb. 1, 2013

(87) PCT Pub. No.: WO2011/154743
PCT Pub. Date: Dec. 15, 2011

(65) Prior Publication Data
US 2013/0199698 A1    Aug. 8, 2013

(30) Foreign Application Priority Data

Jun. 11, 2010 (GB) .................................. 1009769.9

(51) Int. Cl.
*B65B 7/00* (2006.01)
*B29C 65/00* (2006.01)
(Continued)

(52) U.S. Cl.
CPC ................. *B65B 57/00* (2013.01); *B65B 7/164* (2013.01); *B65B 25/00* (2013.01); *B65B 51/14* (2013.01);
(Continued)

(58) Field of Classification Search
CPC .......... B65B 7/16; B65B 7/162; B65B 7/164; B65B 51/00; B65B 51/10; B65B 51/14; B65B 51/144; B65B 43/52; B29C 65/00; B29C 65/02; B29C 65/18; B29C 65/7861; B29C 65/787; B29C 65/7888; B29C 65/7891; B29C 66/53461; B29C 66/112; B29C 66/131; B29C 66/849; B29C 66/81431; B29C 66/843; B29C 66/8432; B29C 66/832; B29C 66/8322; B29C 66/83221; B29L 2031/712; B29L 2031/7162; B29L 2031/7166; B65G 2201/0235
USPC ............. 156/60, 69, 145, 146, 228, 250, 251, 156/267, 269, 270, 292, 308.2, 324, 349, 156/350, 353, 355, 362, 510, 515, 516, 522, 156/538, 539, 543, 552, 580, 581, 583.1; 53/467, 471, 476, 477, 478, 484, 485, 53/266.1, 281, 282, 285, 287, 299, 329, 53/329.2, 329.3, 329.5, 373.7, 375.6
See application file for complete search history.

(56) References Cited

U.S. PATENT DOCUMENTS

| 3,246,448 A | 4/1966 | Amic, Sr. | |
| 2004/0098947 A1* | 5/2004 | Konishi | ....................... 53/329.5 |

(Continued)

FOREIGN PATENT DOCUMENTS

| EP | 0680880 A1 | 11/1995 |
| EP | 1574431 A1 | 9/2005 |

(Continued)

*Primary Examiner* — Philip Tucker
*Assistant Examiner* — Brian R Slawski
(74) *Attorney, Agent, or Firm* — Kenyon & Kenyon LLP

(57) ABSTRACT

The present application relates to tray sealing apparatus (100) comprising a heat sealing tool (6), a pair of laterally spaced transfer mechanisms (66) for transferring trays to and away from the heat sealing tool along corresponding laterally spaced tray feed lanes, film supply apparatus for supplying respective heat sealable films to the sealing tool one in alignment with each tray feed lane. The sealing tool comprises a pair of lower support members (61a, 61b), each aligned with a respective one of the tray feed lanes and on to which one or more trays can be transferred. The tray sealing apparatus further comprises a common upper plate (65) having heaters aligned respectively in use with each tray on the lower support members; and means for selectively moving the lower support members towards the upper plate so as to bring the tray(s) on that lower support member into contact with the corresponding film, whereby the upper plate heat seals the film to the tray(s).

11 Claims, 3 Drawing Sheets

(51) Int. Cl.
  *B32B 37/00* (2006.01)
  *B32B 38/04* (2006.01)
  *B32B 38/10* (2006.01)
  *B30B 5/02* (2006.01)
  *B30B 5/04* (2006.01)
  *B30B 15/34* (2006.01)
  *B65B 1/00* (2006.01)
  *B65B 3/00* (2006.01)
  *B65B 5/00* (2006.01)
  *A61J 3/07* (2006.01)
  *B65B 51/10* (2006.01)
  *B67B 5/00* (2006.01)
  *B65B 7/28* (2006.01)
  *B65B 57/00* (2006.01)
  *B65B 7/16* (2006.01)
  *B65B 51/14* (2006.01)
  *B65B 57/04* (2006.01)
  *B65B 59/04* (2006.01)
  *B65B 25/00* (2006.01)
  *B29C 65/18* (2006.01)
  *B29C 65/78* (2006.01)

(52) U.S. Cl.
  CPC ............... *B65B 57/04* (2013.01); *B65B 59/04* (2013.01); *B29C 65/18* (2013.01); *B29C 65/787* (2013.01); *B29C 66/53461* (2013.01); *Y10T 156/1712* (2015.01)

(56) References Cited

U.S. PATENT DOCUMENTS

2006/0123739 A1* 6/2006 Konishi ..................... 53/329.3
2011/0072764 A1* 3/2011 Daniek et al. .................. 53/556

FOREIGN PATENT DOCUMENTS

| EP | 2052974 A1 | 4/2009 |
| JP | S53-133335 | 4/1980 |
| JP | S55-050932 U * | 4/1980 |

* cited by examiner

TRAY SEALING APPARATUS AND METHOD

The invention relates to tray sealing apparatus. In this context, the term "tray" means any container having an upwardly facing opening to which a film is to be heat sealed.

It is common in the food industry to package food items in heat sealed trays and this must be done at high speed in view of the high throughput required, particularly for fresh fruit. In one conventional apparatus, trays are fed along a conveyor, filled with food items and then supplied, typically in groups, to a tray sealer having a heat sealing tool. The tool has an upper, heated plate which is brought into engagement with a heat sealable film and the edge of the or each tray so as to heat seal the film to the tray(s). The tray(s) is then removed from the tray sealer.

In order to increase throughput, it is known to provide a twin lane device, an example of which is the QX-1100 manufactured and sold by Ishida Europe Limited of Birmingham, United Kingdom. In this apparatus, a pair of conveyors are provided which effectively define two tray sealing lanes. In use, trays are fed along each lane by the conveyors to the tray sealer in synchronism. Sets of trays are then transferred in parallel by respective gripper arms to the tray sealer. Film is then sealed to the two sets of trays simultaneously and the trays are then removed from the tray sealer. As will be appreciated, this effectively doubles the throughput of the single lane device.

A problem has arisen, particularly in the fresh food packaging industry, in view of the need to be able to respond very quickly to orders for packaged products of a variety of different types. Thus, a packaging firm may be asked to package a quantity (i.e. a number of trays) of one fresh food product and a quantity of a different fresh food product, those quantities being relatively small such that the need for high throughput is of lower importance. At present, in order to achieve this, the packaging firm either operates a twin lane device described above for a relatively short time on each product or alternatively a single lane device for a longer time, first on the first product and then on the second product. In each case, between two operations it may be necessary to change one or more of the heat sealing tool or gripper arms in view of the fact that the trays may have different dimensions for each product and/or the film.

In order to reduce the problem, it would be possible to utilize two single lane tray sealers. However, this significantly increases costs in view of the need for there to be two operators but also two single lane tray sealers will take up a substantial amount of space as compared with the known twin lane tray sealer. The use of two single lane machines also significantly increases cost.

Another option would be to utilize a single high speed, single lane tray sealer but this is not always convenient. For example, in the case of a production line which starts with a complete chicken which is then portioned, it would be necessary to store chicken wings whilst the breasts are being packed rather than processing the different portions at the same time.

In accordance with the present invention, tray sealing apparatus comprises a heat sealing tool; a pair of laterally spaced transfer mechanisms for transferring trays to and away from the heat sealing tool along corresponding laterally spaced tray feed lanes; film supply apparatus for supplying respective heat sealable films to the sealing tool one in alignment with each tray feed lane, wherein the sealing tool comprises a pair of lower support members, each aligned with a respective one of the tray feed lanes and on to which one or more trays can be transferred, and a common upper plate having heaters aligned respectively in use with each tray on the lower support members; and means for selectively moving the lower support members towards the upper plate so as to bring the tray(s) on that lower support member into contact with the corresponding film, whereby the upper plate heat seals the film to the tray(s).

With this intervention, significant flexibility is introduced into a conventional twin lane apparatus. Thus, instead of the two lanes operating in synchronism, it is possible for them to work independently or semi-independently, particularly by providing the two lower support members within the heat sealing tool which can then be operated asynchronously allowing different trays to be handled at different rates in the two lines extending through the heat sealing tool.

The invention has particular advantages in the case of fresh food packaging. For example, it is more difficult when packaging fresh food for individual pieces to correspond to a desired target weight. With the invention, it is possible to package food in two different tray sizes corresponding to different target weights at the same time, although typically at different speeds. Furthermore, it would even be possible to package a fixed weight on one lane and a random weight on the other. In a particular example, a packaging company may receive an order for 20,000 packs of 400 g and 30,000 packs of 700 g. The product is the same but the target weight is different. Because it is a fresh product, it has to be packed on the same day but the order is going out to different customers. Currently, the operators have to change tools many times a day in order to fulfil this requirement and, on each occasion, production time is lost. By providing both tools on the same machine simultaneously, production can continue without interruption. One can even change one tool while another one is running. This is also the case when packing the same product and the same target weight but with different film for two different customers. Instead of separate production runs, one can do both at the same time.

Packaging weights of up to 120 to 180 trays per minute are achievable using the invention.

In one example, the means for selectively moving the lower support members comprises independently controllable lifting mechanisms, one for each of the lower support members.

Alternatively, the means for selectively moving the lower support members comprises a single lifting mechanism, and a linkage for connecting the single lifting mechanism to one or both of the lower support members.

It will be appreciated that apparatus according to the invention overcomes the problems mentioned above since it will be much cheaper than two single lane machines while also having a much lower "footprint" than two single lane machines.

Although trays could be supplied to the tray sealing apparatus using a robotic transfer or the like, typically, the apparatus further comprises tray supply apparatus comprising a pair of independently operable conveyors aligned with the respective lower support members of the heat sealing tool.

In an embodiment the upper plate comprises a pair of independently operable upper plates having heaters aligned respectively in use with each tray on respective lower support members.

In another embodiment said upper plate is a singularly operable common upper plate.

In a further embodiment the tray sealing apparatus further comprises tray supply apparatus comprising a pair of independently operable conveyors aligned with the respective lower support members of the heat sealing tool.

In embodiments the transfer mechanisms comprise mechanical grippers for gripping one or more trays and transferring them to the corresponding lower support member of the heat sealing tool, each gripper being adapted to handle trays of different dimensions.

In embodiments the heat sealing tool comprises a plurality of individually operable heaters, each aligned with a respective tray in the tool in use.

In a further aspect of the present invention there is provided a method of tray sealing utilising tray sealing apparatus comprising: transferring at least one tray to and away from the heat sealing tool along the corresponding laterally spaced tray feed lanes; supplying respective heat sealable films to the sealing tool one in alignment with each tray feed lane; and selectively moving the lower support members towards the common upper plate so as to bring the tray(s) into contact with the corresponding film whereby the upper plate heat seals the film to the tray(s).

In an embodiment the method further comprises suspending operation of one of the two tray feed lanes; replacing tray tooling comprising any aspect(s) of the lower support member, upper plate heaters or independently controllable lifting mechanism corresponding to the suspended tray feed lane while maintaining production on the operational tray feed lane.

Preferably maintaining production on the operational tray feed lane comprises: transferring at least one tray to and away from the heat sealing tool along the operational tray feed lane, supplying respective heat sealable films to the sealing tool in alignment with the operational tray feed lane, and selectively moving the lower support member of the operational tray feed lane towards the common upper plate so as to bring the tray(s) into contact with the corresponding film whereby the upper plate heat seals the film to the tray(s).

In a further aspect there is provided a method and apparatus as hereinafter described with reference to the accompanying drawings and description.

Embodiments of the present invention will now be described and contrasted with the prior art with reference to the accompanying drawings in which.

Figure 1:
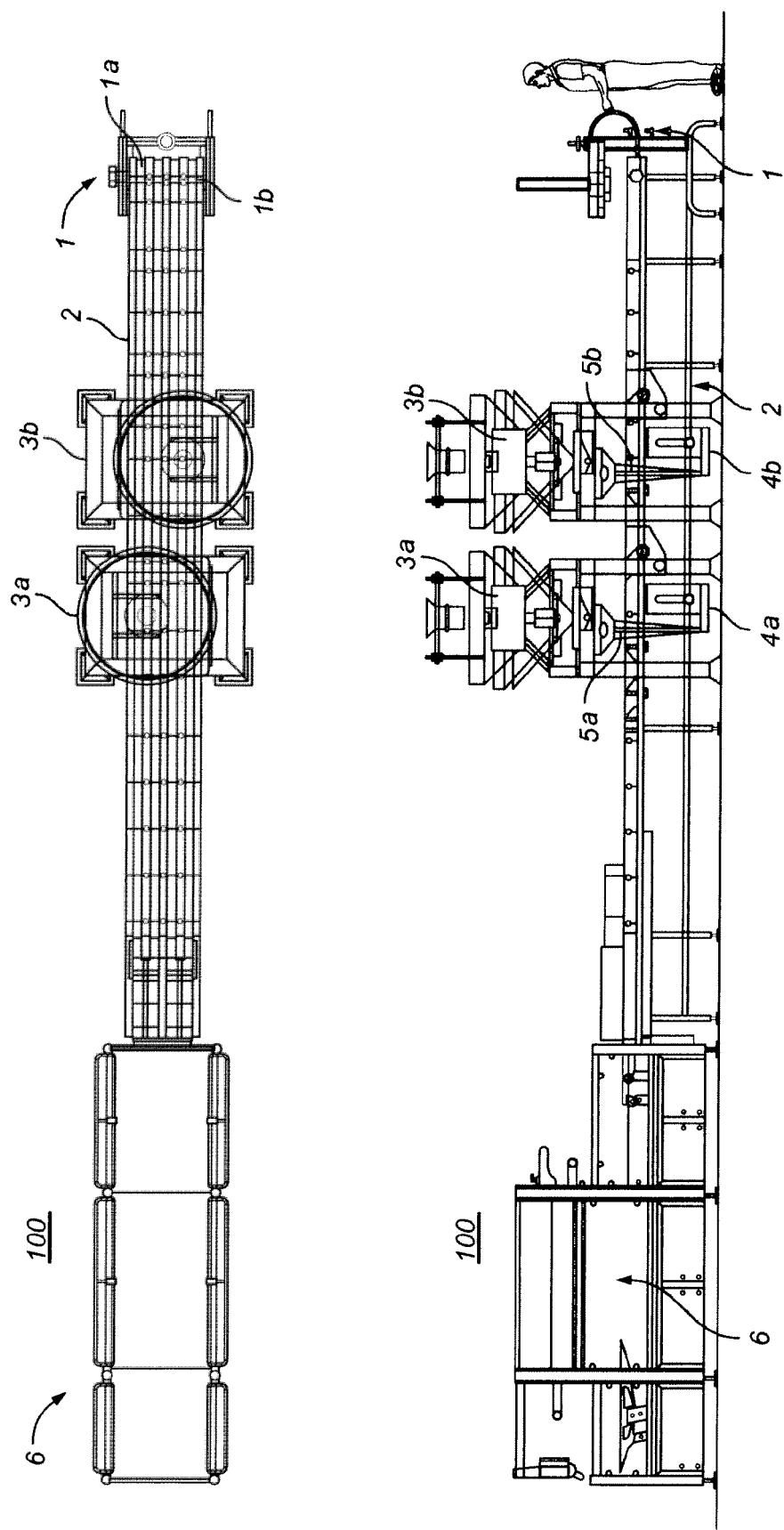
FIG. 1 is a schematic diagram of a food packaging system comprising a tray sealer according to an embodiment of the present invention.
Figure 3:
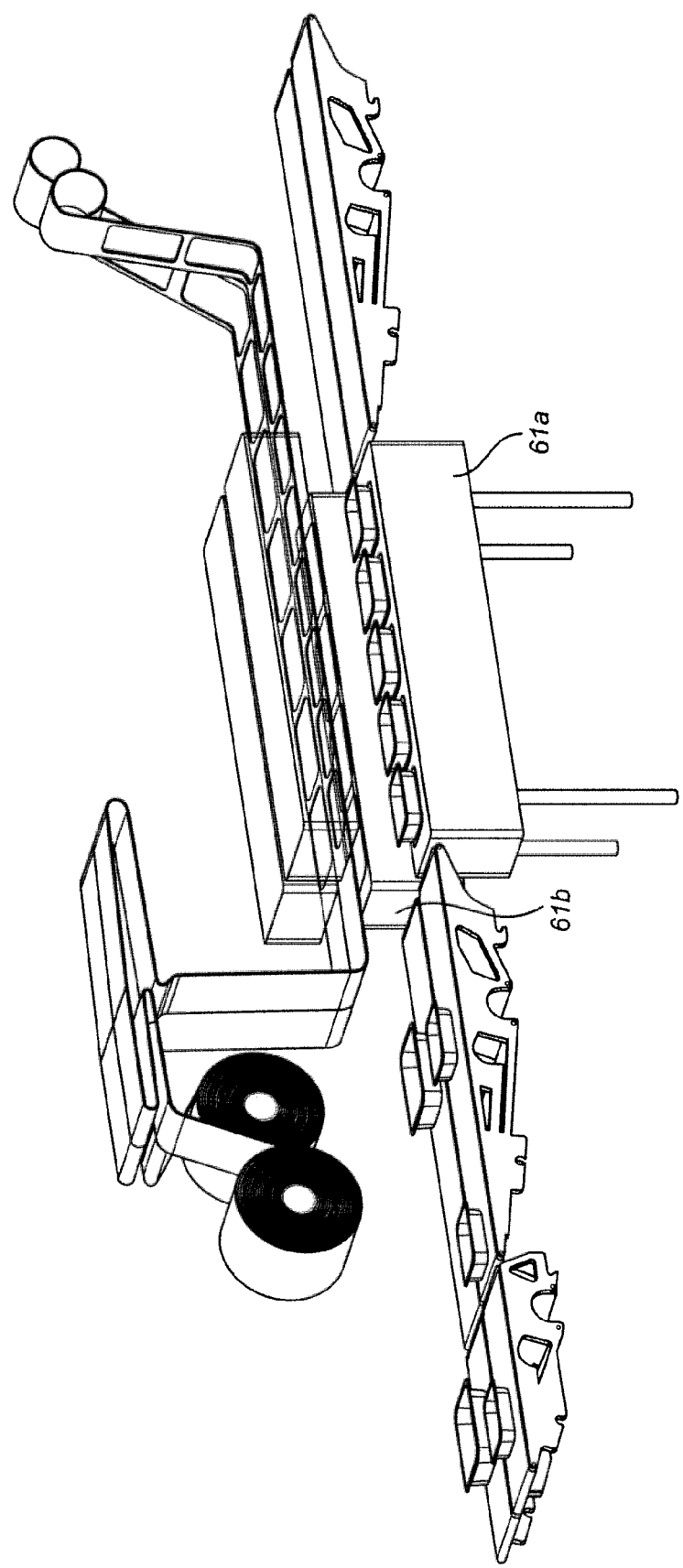

FIG. 3 shows a zoomed in view of the sealing apparatus wherein the lifter of the first lane is raised independently of the lifter of the second lane; and Turning first of all to FIG. 1, there is shown a food packaging system 100 comprising a twin tray de-nester 1, a twin lane conveyor 2. Two computer combination weighers (CCWs) 3a and 3b and a tray sealer 6 are positioned along the transport path. The CCWs 3a and 3b being operable to weigh and distribute product and the tray sealer being operable to seal the trays conveyed along the transport path into which trays are conveyed from the twin lane conveyor 2 and sealed.

The food packaging system 100 has two lanes along which trays can be conveyed, filled and sealed. The trays are typically supplied in nests and sit within respective tray cassettes of the twin tray de-nester 1. The tray de-nester used is a scroll de-nester in order to minimize contact with the surface of the trays but it will be appreciated that other conventional de-nesters known in the art could alternatively be used. The trays are extracted from the first and second tray cassettes 1a and 1b of the de-nester and supplied on the conveyors 3a and 3b at regular intervals. The extracted trays are equally spaced from each other along the conveyors 3a and 3b. The twin tray de-nester 1 holds trays in first and second tray cassettes said trays in the first and second cassettes having equal or different dimensions respectively.

The trays deposited by the de-nester 1 are transported towards the respective CCWs 3a and 3b by the twin lane conveyor 2. The lanes of the conveyor 2 pass under the respective CCWs 3a and 3b. Each CCW 3a, 3b is configured to weigh a predetermined quantity of product. The predetermined quantity of product is selected to correspond to the dimensions of the tray in the corresponding lane over which the respective CCW 3a, 3b is positioned. Beneath the CCWs 3a and 3b there are positioned respective reciprocating distribution systems 4a and 4b. Each distribution system is positioned beneath a corresponding CCW 3a, 3b and arranged such that product delivered from the CCW 3a, 3b is received into a delivery head 5a, 5b of the distribution system. The distribution system is operable to oscillate the position of the head 5a, 5b above a passing tray in a reciprocal manner such that the product is evenly distributed across the tray. In this manner, every passing tray on the twin lanes is evenly filled with a quantity of product corresponding to the tray size being used in the respective lane.

After passing under the CCWs 3a and 3b the filled trays are transported towards the tray sealer 6. The tray sealer 6 is shown in more detail in FIG. 2.

As shown, the tray sealer 6 comprises first and second lifters 61a and 61b (corresponding to the first and second lanes of the twin conveyor 2 respectively) and a single sealing tool comprising a common plate positioned above the lifters 61a and 61b. The lifters 61a and 61b have independent mechanisms permitting each lifter to be raised and lowered independently of the other which are operable to be computer controlled via software or a hardware controller. The common upper plate comprises a first and second set of impressions positioned so as to be aligned with trays carried by the first or second lifters. The sets of impressions comprise cutters tooled to fit the dimensions of a predetermined tray size being carried by the corresponding lane. First and second film feeding systems independently receive reams of film from corresponding film rolls and feed the received film under the sealing tool such that the film from the feeding systems is aligned with respective first and second lifters. In this embodiment the feeding systems comprise a set of mechanical rollers arranged to wind the reams of film from the film rolls to the desired position under the sealer to a used film roll.

Figure 2:
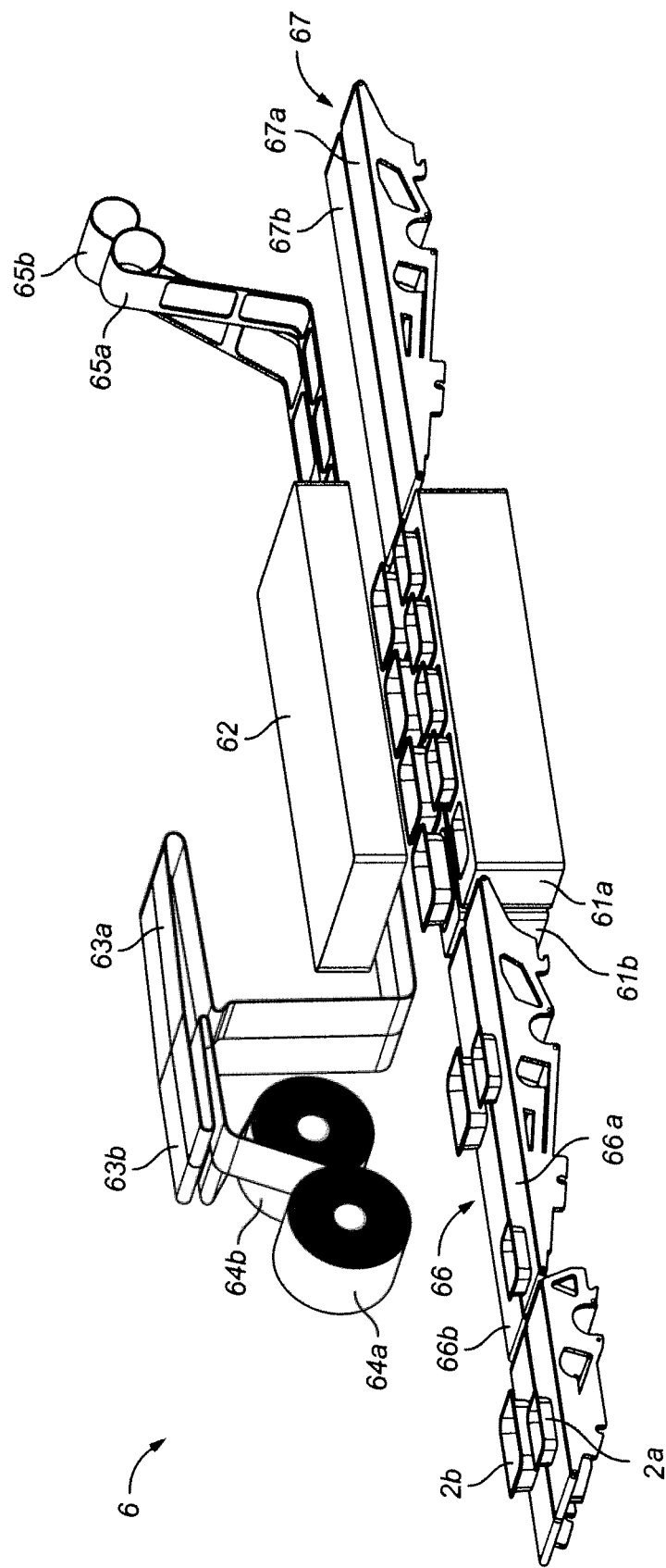
FIG. 2 is a perspective view of a dual lane tray sealer in an embodiment of the present invention in which different tray sizes are used in each lane.

Operation of the tray sealer 6 will now be described with reference to FIGS. 2 and 3. Filled trays are transported along the first and second lanes of the conveyor onto corresponding lanes 66a and 66b of a spacing conveyor 66. The spacing conveyor has stops for stopping the trays at predetermined spacing along the conveyor and the conveyor is sized to have a tray capacity equal to its corresponding tray lifter 61a or 61b respectively. After a certain amount of time has elapsed each lane 66a and 66b of the spacing conveyor 66 is filled with trays transported from the main conveyor 2. Once the spacing conveyor is filled, first and second gripping arms (not shown) lift the trays in parallel from the filled spacing conveyor lanes 66a and 66b onto the first and second lifters 61a and 61b respectively. Simultaneously, the gripping arms also transport in parallel any trays present on the first and second lifters 61a and 61b onto respective lanes 67a and 67b of an output conveyor 67.

Once the trays have been placed on the respective lifters then the tray sealing process takes place. In this embodiment the lifters (although having independent lifting mechanisms) are linked such that they are lifted in synchronism towards the sealing tool 62 during a sealing cycle. The trays are thereby pushed into contact with the reams of film from film rolls 64a and 64b and the assembly of tray and film is pressed against a corresponding impression on the lower surface of the sealing tool 62. The impression heats the film around the edge of the tray thereby sealing the film to the tray edge while cutters trim the film around the perimeter releasing the film from the ream. The lifters, now containing sealed trays, are then lowered back to their original position. While the tray sealing process is being performed, the lanes 66a and 66b of spacing conveyor 66 are re-filled with fresh trays. Thus, the cycle is completed with the sealed trays being moved by the gripping arms to the output conveyor 67 while the fresh unsealed trays are simultaneously transported by the gripping arms from the spacing conveyor 66 to the tray lifters 61a and 61b.

In the illustrated embodiment, the first lane 2b has trays of smaller dimension to those in the second lane 2b such that when the equally sized lifters 61a and 61b are filled with trays the first lifter 61a will contain 5 laterally spaced trays while the second lifter 62a will contain 4 trays. In order to balance the feed of trays to the lifters 61a and 61b the first lane 2a could be running, for example, at a speed of 50 trays/minute while the second lane 2b runs at 40 trays/minute. Accordingly the tray lifter is configured to perform 10 sealing cycles per minute such that trays are sealed continuously and without interruption.

As described above each tray lifter 61a has an independent mechanism for raising the lifter towards the sealing tool 62. As a result in the event of an error or if the operator wishes to re-tool one lane to take trays or containers of a different capacity then it is possible to stop one lane of the tray sealer 6 while continuing operation in the other lane. Tray sealing can therefore continue in the in one lane while the re-tooling process takes place for the other resulting in increased productivity and throughput of the machine.

In the above described embodiment, where the two lifters are described as being linked such that they are raised in synchronicity, a balanced feed of trays to the lifters is required. The feeding rate of trays to each lifter has to be carefully balanced particularly when the trays in each lane are of a different size. However, in an alternative embodiment the tray lifters are not so linked and are controlled such that they are raised independently of each other. In order for this to work the sealer is adapted such that each lane has independent gripper arms that independently transport the trays in each lane to and from their corresponding lifters 61a and 61b. Further, the film dispensers 63a and 63b and the impressions on the tray sealing tool 62 are also independently controlled such that they are activated at the appropriate time to such that fresh film and heat is provided to perform sealing as required for a respective lane.

This arrangement has the advantage of permitting an unbalanced feed of trays to be provided from the dual conveyor lanes 2a and 2b to the respective lifters 61a and 61b. In this mode of operation the tray sealer effectively acts as two independent machines but as a result of the common tray sealing tool has a greatly reduced foot print in comparison to two separate machines positioned adjacently on, for example, a factory floor.

Even where the two lifters are linked, because of the independent lifting and control mechanisms for each lifter it is possible to unlink the lifters and switch off one or other lane for the purpose of retooling or maintenance. In this way the other lane can continue to run while the other lane is, for example, retooled for a different tray size. The lifters can then be re-linked or operated separately as is required according to the requirements of the production run.

It is also possible to operate the lifters independently such that each lifter provides a different rate of sealing cycles. Thus one lifter can be raised and sealing performed while the other is still receiving trays. FIG. 3 shows such an embodiment in which the second lifter 61b is raised towards the sealing tool while the first lifter 61a remains lowered. This arrangement provides maximum flexibility in terms of tray size and throughput.

The invention claimed is:

1. A tray sealing apparatus comprising a heat sealing tool; a pair of laterally spaced transfer mechanisms for transferring trays to and away from the heat sealing tool along corresponding laterally spaced tray feed lanes; film supply apparatus for supplying respective heat sealable films to the sealing tool, one heat sealable film in alignment with each tray feed lane, wherein the sealing tool comprises a pair of lower support members aligned with a respective one of the tray feed lanes and on to which one or more trays can be transferred; an upper plate having heaters aligned respectively in use with each tray on the lower support members; and means for selectively moving each of the lower support members towards the upper plate so as to bring the tray(s) on that lower support member into contact with the corresponding film, whereby the upper plate heat seals the film to the tray(s).

2. Apparatus according to claim 1, wherein the means for selectively moving each of the lower support members comprises a single lifting mechanism, and a linkage for connecting the single lifting mechanism to one or both of the lower support members.

3. Apparatus according to claim 1, wherein the means for selectively moving each of the lower support members comprises independently controllable lifting mechanisms, one for each of the lower support members.

4. Apparatus according to claim 1, wherein said upper plate comprises a pair of independently operable upper plates having heaters aligned respectively in use with each tray on respective lower support members.

5. Apparatus according to claim 1, wherein said upper plate is a singularly operable common upper plate.

6. Apparatus according to claim 1, further comprising tray supply apparatus comprising a pair of independently operable conveyors aligned with the respective lower support members of the heat sealing tool.

7. Apparatus according to claim 1, wherein the transfer mechanisms comprise mechanical grippers for gripping one or more trays and transferring them to the corresponding lower support member of the heat sealing tool, each gripper being adapted to handle trays of different dimensions.

8. Apparatus according to claim 1, wherein the heat sealing tool comprises a plurality of individually operable heaters, each aligned with a respective tray in the tool in use.

9. A method of tray sealing utilising a tray sealing apparatus comprising a heat sealing tool; a pair of laterally spaced transfer mechanisms for transferring trays to and away from the heat sealing tool along corresponding laterally spaced tray feed lanes; film supply apparatus for supplying respective heat sealable films to the sealing tool, one heat sealable film in alignment with each tray feed lane, wherein the sealing tool comprises a pair of lower support members, each lower support member aligned with a respective one of the tray feed lanes and on to which one or more trays can be transferred; an upper plate having heaters aligned respectively in use with each tray on the lower support members; and means for selectively moving each of the lower support members towards the upper plate so as to bring the tray(s) on that lower support member into contact with the corresponding film, whereby the upper plate heat seals the film to the tray(s), said method comprising transferring at least one tray to and away from the heat sealing tool along the corresponding laterally spaced tray feed lanes;

supplying respective heat sealable films to the sealing tool, one heat sealable film in alignment with each tray feed lane; and selectively moving the lower support members towards the upper plate so as to bring the tray(s) into contact with the corresponding film whereby the upper plate heat seals the film to the tray(s).

10. A method of tray sealing utilising a tray sealing apparatus comprising a heat sealing tool; a pair of laterally spaced transfer mechanisms for transferring trays to and away from the heat sealing tool along corresponding laterally spaced tray feed lanes; film supply apparatus for supplying respective heat sealable films to the sealing tool, one heat sealable film in alignment with each tray feed lane, wherein the sealing tool comprises a pair of lower support members, each lower support member aligned with a respective one of the tray feed lanes and on to which one or more trays can be transferred; an upper plate having heaters aligned respectively in use with each tray on the lower support members; and means for selectively moving each of the lower support members towards the upper plate so as to bring the tray(s) on that lower support member into contact with the corresponding film, whereby the upper plate heat seals the film to the tray(s), and wherein the means for selectively moving the lower support members comprises a single lifting mechanism, and a linkage for connecting the single lifting mechanism to one or both of the lower support members, said method comprising transferring at least one tray to and away from the heat sealing tool along the corresponding laterally spaced tray feed lanes;

supplying respective heat sealable films to the sealing tool, one heat sealable film in alignment with each tray feed lane; and selectively moving the lower support members towards the upper plate so as to bring the tray(s) into contact with the corresponding film whereby the upper plate heat seals the film to the tray(s), the method further comprising:

suspending operation of one of the two tray feed lanes;

replacing tray tooling comprising any aspect(s) of the lower support members, upper plate heaters or independently controllable lifting mechanisms corresponding to the tray feed lane while maintaining production on an operational tray feed lane.

11. A method according to claim 10 wherein maintaining production on the operational tray feed lane comprises:

transferring at least one tray to and away from the heat sealing tool along the operational tray feed lane, supplying respective heat sealable films to the sealing tool in alignment with the operational tray feed lane, and selectively moving the lower support member of the operational tray feed lane towards the common upper plate so as to bring the tray(s) into contact with the corresponding film whereby the upper plate heat seals the film to the tray(s).

* * * * *